Nov. 2, 1954  G. R. TREMOLADA  2,693,373
SWIVEL CONNECTION FOR FLUIDS
Filed Feb. 6, 1951  2 Sheets-Sheet 1
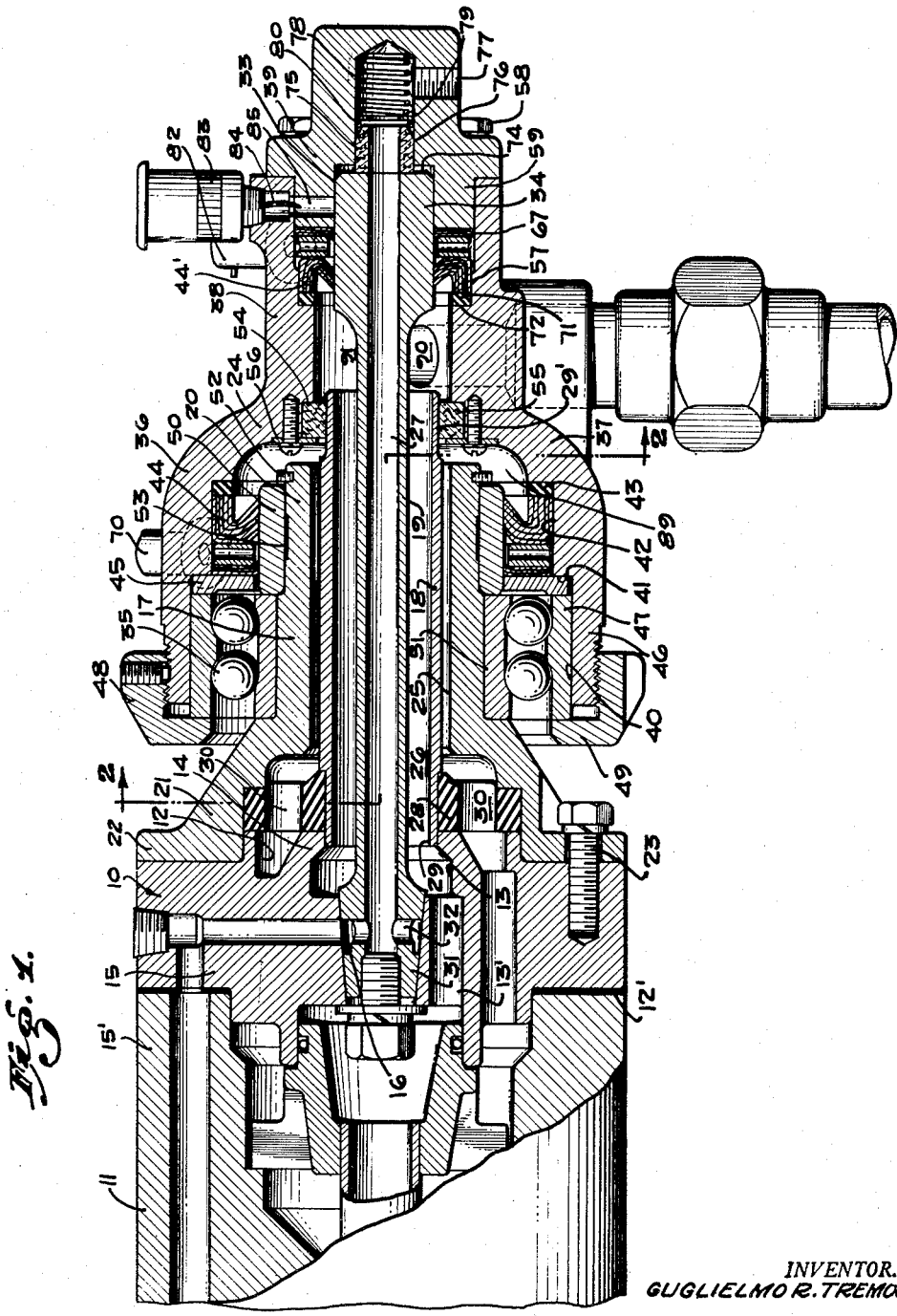
INVENTOR.
GUGLIELMO R. TREMOLADA,
BY
ATTORNEY Nov. 2, 1954  G. R. TREMOLADA  2,693,373
SWIVEL CONNECTION FOR FLUIDS
Filed Feb. 6, 1951  2 Sheets-Sheet 2
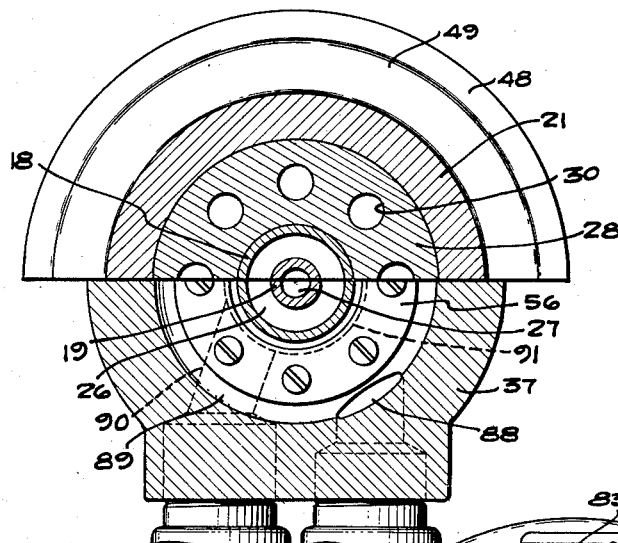
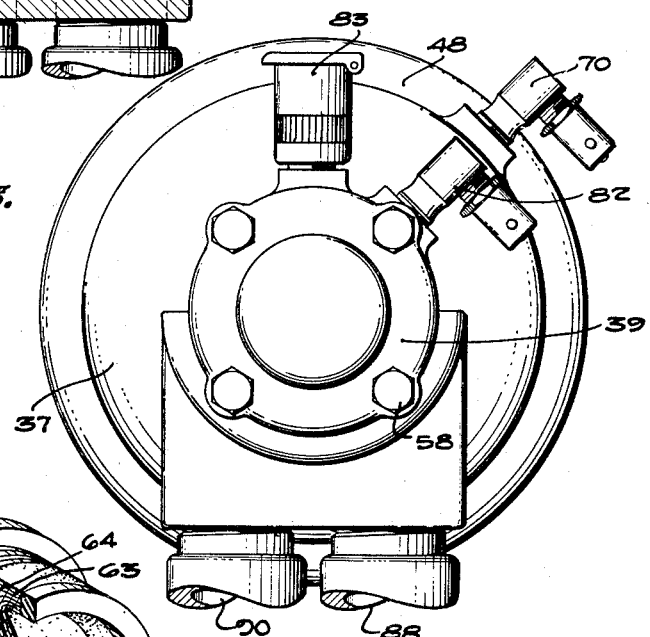
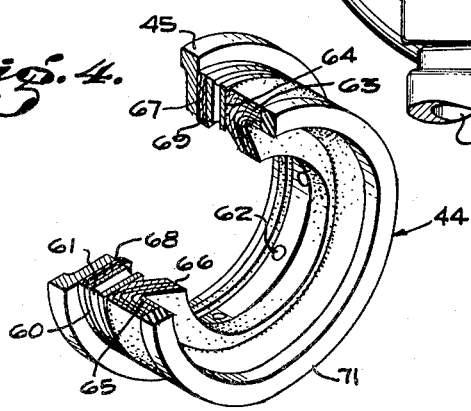
INVENTOR.
GUGLIELMO R. TREMOLADA,
BY
ATTORNEY United States Patent Office 2,693,373
Patented Nov. 2, 1954

2,693,373

SWIVEL CONNECTION FOR FLUIDS

Guglielmo R. Tremolada, Los Angeles, Calif., assignor to Emsco Manufacturing Company, a corporation of California Application February 6, 1951, Serial No. 209,667

4 Claims. (Cl. 285—96.3)

My invention relates to swivel connections for conducting fluids between relatively movable parts. The invention may be employed between two parts which are rotating in opposite directions or at different speeds, or between a rotating member and a stationary member. An extensive use of the invention is where a rotating device has passages or spaces of which must receive fluids from containers or sources which are supported by stationary structures.

It is an object of the invention to provide a swivel connection comprising two main parts in telescoping relation, one of these parts having a plurality of passages for different fluids and the other of the main parts likewise having ports or passages for the fluids communicating with the passages of the first named part, and sealing means between the parts segregating the paths of flow of fluids, while permitting relative rotation of the main parts.

It is an object of the invention to provide a swivel connection having an inner-organization and a shell arranged to be moved into a position wherein a major portion of the shell surrounds the parts of the inner-organization, with an association and form of co-operating parts enabling facility of installation of the shell upon the inner-organization and likewise removal of the shell from the inner-organization to permit inspection and or replacement of parts within the swivel connection.

It is an object of the invention to provide a swivel connection having an inner-organization comprising an outer cylindrical wall with a smaller cylindrical wall projecting axially from the other end thereof, a shell surrounding the organization and having sealing means for engaging the outer cylindrical wall and also the projecting, smaller cylindrical wall, the inner-organization having a passage which communicates with the space within the shell between the sealing means and another passage in the shell which communicates through the end of the smaller cylindrical wall with a space lying beyond the sealing means which engages the smaller, projecting cylindrical wall.

It is a further object of the invention to provide a swivel connection having an outer cylindrical wall or tube projecting from the relatively rotatable member, a second tube extending through the outer tube with its end projecting from the end of the outer tube, and a third tube extending through the second tube, with its outer end projecting from the end of the second tube, there being a cup shell surrounding the organization or assembly of tubes having sealing means respectively engaging the outer tube, second tube, and third tube so as to define paths of flow in the shell communicating with first, second and third ducts which are defined by the tubes.

A further object of the invention is to provide a swivel connection wherein the parts are so formed and related that the shell of the swivel connection may be machined in one piece, thereby simplifying the machining operations and effecting alignment of the plurality of bores within the shaft.

A further object of the invention is to provide a simplified supporting means for the intermediate tube of the swivel connection, and a further object of the invention is to provide a simple yet durable and long-wearing annular seal cartridge assembly, and also a simplified seal for co-operation with the end face of the inner cylindric wall of the inner-organization of the rotary swivel.

The invention disclosed herein is an improvement over the swivel connection disclosed in my Patent No. 2,407,043, granted September 3, 1946 for Air Operated Clutch.

Further objects of the invention will be brought out in the following part of the specification wherein I have in detail explained a preferred embodiment of the invention for the purpose of fully disclosing the invention without limiting the scope thereof set forth in the appended claims.

Referring to the drawings which are for illustrative purposes only:

Fig. 1 is a sectional view showing a preferred embodiment of the invention connected to a rotatable member.

Fig. 2 is a sectional view taken as indicated on the line 2—2 of Fig. 1.

Fig. 3 is a view looking toward the rightward end of the swivel connection disclosed in Fig. 1.

Fig. 4 is an isometric sectional view of one of the packing cartridges disclosed in Fig. 1.

In Fig. 1, I show a relatively rotatable member 10, which may be secured through a shaft 11 or other rotatable part in axial alignment therewith. The member 10 has an annular passage 12. In the rightward or other face thereof, is an annular passage 13 of a smaller diameter than the passage 12 communicating with the other face of the member 10 and being separated from the annular passage 12 by an annular wall 14. The member 10 has a third passage 15 which communicates with a tapered bore 16 disposed on the axis of rotation of the member 10. Continuations of the passages 12, 13 and 15, indicated respectively by the numerals 12', 13' and 15' communicate with passages in the shaft 11 which extend to mechanisms or chambers supported upon, and rotatable with, the shaft 11.

The swivel connection comprises two main parts which are relatively rotatable, these main parts being an inner-organization consisting of tubes 17, 18 and 19. The first or outer tube 17 has a cylindric wall 20 and a flared wall portion 21 provided with a flange 22 arranged to be secured by screws 23 to the rotatable member 10. The first tube 17 is relatively rugged in construction since it supports the outer part or shell 24 of the swivel connection. The second tube 18 is cylindrical and extends through the outer tube 17 so as to define therein an annular first passage 25. The third tube 19 extends through the second tube 18 and defines therein a passage 26. The inner tube 19 has axially there through a third passage 27. A flange 28 of rubber compound is molded upon the inner end 29 of the second tube 18. The peripheral portion of the flange 28 is clamped between the flared wall 21 of the outer tube 17 and the member 10, and this flange 28 has therein openings 30 through which the first passage or duct 25, between the tubes 17 and 18, communicates with the annular passage 12 of the member 10. The inner end 29 of the second tube projects into the mouth defined by the annular wall 14 and connects the second passage or duct 26 with the second passage 13 of the member 10. The third tube 19 has at its inner end a tapered head 31 which is seated in the tapered bore 16 of the member 10. Radial openings 32 in the head 31 connect the inner end of the third duct 27 with the third passage 15 of the member 10.

The front end 29' of the second tube 18 projects from the front end of the first tube 17, and the front end 33 of the third tube 19 projects from the front end of the second tube 18 and has thereon a cylindric enlargement or head 34. The shell 24 fits over or surrounds a major portion of the inner-organization and is rotatably supported on the cylindric portion of the tube 17 by a combined radial and thrust bearing 35. The shell 24 has a bell shaped portion 36 which surrounds the cylindrical wall 20 of the tube 17. The rightward end of the bell includes a wall 37 which converge adjacent the outer end of the wall 17 and supports a cylindric wall portion 38 which surrounds a portion of the tube 18 and also the projecting end 33 of the tube 19. The rightward end of the shell 24 is closed by a cap 39.

The bell shape portion 36 of the shell 24 has at its inner or leftward end a relatively larger concentric bore 40, an annular shoulder 41 at the rightward end of the bore 40 and a relatively smaller bore 42 continuing rightwardly from the shoulder 41 to a shoulder 43. The relatively smaller bore 42 defines an annular recess which receives a packing cartridge 44. The packing cartridge 44 is retained in the bore 42 by a ring 45 which rests against the shoulder 41. The relatively larger bore 40 defines a bearing recess in which the bearing 35 is contained. The cylindric wall 46 of the bell 36, disposed around the bore 40 may be slid on and off the outer race 47 of the bearing 35. A ring 48 threaded on the end of the wall 46, has an inwardly directed flange 49 which engages the leftward end of the outer race 47 and holds the race 47 within the bore 40, and in this way holds the bell shaped portion 36 of the shell 24 on the bearing 35, so that the bearing serves as a means for supporting the shell 24 in alignment with the outer tube 17. A hardened steel sleeve 50, secured on the cylindric wall 20 of the tube 17, rotates within the sealing means consisting of the packing cartridge 44. The sleeve 50 holds the inner race 51 of the bearing 35 on the tube 17, and is in turn retained on the tube 17 by a snap ring 52. Within the sleeve 50, a small amount of gasket compound 53, disposed in a shallow groove in the outer surface of the tube 17, prevents leakage of fluid along the surface of the tube 17 within the sleeve 50 and also locks the sleeve 50 on the tube 17 so that the sleeve 50 rotates within the packing cartridge of 44.

At the inner or leftward end of the cylindric wall portion 38 of the shell 24 there is a counterbore 54 which holds an annular wall or ring 55 in sealing relation to the projecting end of 29' of tube 18. The sealing ring 55 is held in the counterbore 54 by a screw retained annular plate 56. In the present embodiment of the invention, the sealing means 55 is made of a material having low friction characteristics in the presence of water. In the rightward or outer end of the wall 38 there is a counterbore 57 which receives a packing cartridge 44', similar to but smaller than the packing cartridge 44. The cap 39, which is secured to the ends of the cylindric wall 38 by screws 58, has a cylindric wall 59 projecting into the counterbore 57 to receive the end of the head 34 comprising the end 33 of tube 19.

The description of the packing cartridge 44, disclosed in Fig. 4 is intended to apply also to the smaller packing cartridge of 44'. This packing cartridge 44 includes a metal lubricant introducing ring 60 having a shallow external channel 61 and radial openings 62 connecting the channel 61 with the inner face of the ring 60. A molded sealing ring 63 is cemented on to the pressure-receiving face 64 of the ring 60. The sealing ring 63 comprises an annular body 65 of substantially rectangular cross section. This body 65 having an outside diameter corresponding to the diameter of the bore 42 of the shell 24. Projecting from that portion of the body 65 which engages the ring 60, the body 65 has a lip 66 which projects diagonally toward the surface of the sleeve 50, Fig. 1, and toward the direction in which fluid pressure is received. That is to say, the lip 66 project diagonally toward the right end of the tube 17. A relatively thin grease retainer ring 67 is cemented on to face 68 of the ring 60 opposite from the face 64. This grease retainer ring 67 has an inner lip 69 adapted to engage the surface of the metal sleeve 50, Fig. 1, and resist leftward movement along the sleeve 50 of lubricant which is fed in through a lubricant fitting 70, thereby causing the introduced lubricant to move rightwardly along the surface of the sleeve 50 beneath the lip 66 of the sealing ring 63. The previously mentioned ring 45 is cemented on to the grease retaining ring 67, and a sealing ring 71 of relatively soft rubber is cemented on to the rightward face of the body 65, in a position to engage the shoulder 43 and prevent fluid from leaking around the outer face of the sealing ring 63. The sealing ring 44' differs from the sealing ring 44 only in the absence therein of the ring 45.

As shown in Fig. 1 the packing cartridge 44' is held in the inner portion of the counterbore 57 by the cylindrical wall 59 of the cap 39 which has a radial end face to engage the grease retaining ring 67 of the packing cartridge 44'. The axial dimension of the cylindrical wall 59 is such that when the cap 39 is secured in the position of which it is shown in Fig. 1 the sealing ring 71 at the leftward end of the packing cartridge 44' will be forced tightly against the shoulder 72 defining the inner limit of the counterbore 57.

The cylindrical body 34 at the outer end of the third tube 19 has a radial end of face 74, and the cap 39 has an opening 75 confronting the end face 74 of the body 34 and axially aligned with the tube 19. The opening 75 is cylindrical and is of a larger diameter than the third duct 27 which extends axially from end to end of the tube 19. In the opening 75 there is a tubular sealing piston 76 which is cylindrical in the opening 75 and which engages the end of face 74 of the tube 19. A port 77 communicates with the opening 75 for introduction of fluid under pressure. This fluid under pressure acts against the rightward end of the tubular piston 76 and forces the same against the face 74 of the head 34. A spring 78 is also provided for the purpose of urging the tubular piston 76 leftward. This spring 78 acts in compression against a ring 79 which in turn acts against a rubber sealing ring 80 which is in direct engagement with the rightward end of the tubular piston 76. The rightward end of the piston 76 is tampered so as to provide an annular space to receive the rubber ring 80 and providing a conical surface against which the ring 80 is moved outwardly so as to make effective sealing engagement with the wall surface defining the opening 75. A grease fitting 82 is provided for supplying lubricant to the packing cartridge 44'. An oil cup 83, mounted near the end of the cylindrical wall 38, has an oil feed wick 84 for delivery of lubricant through a radial opening 85 in the cylindrical wall 59 to the surface of the head 34 which rotates within cylindrical wall 59.

The shell 24 has a port 88 communicating with the space 89 which exists within the shell 24 between the sealing means 44 and the sealing means 54. A second port 90, in the shell 24, communicates with the space 91 within the shell 24 between the sealing means 55 and the sealing means 44'. The third port of the shell consists of the port 77 which is disposed beyond, or rightwardly of, the third sealing means of 44', for communicating with the third duct 27 of the organization which is rotatable within the shell 24.

In the use of the swivel connection shown in Fig. 1, three different fluids may be passed through the first, second, and third ports and through first, second, and third ducts in communication therewith, or cooling water may be passed in through one of the ports 88 or 90 and out through the other of these ports and compressed air for actuation of a mechanism carried by the shaft 11 may be fed in through the port 77 and through the third duct 27 and the third passage 15 of the relatively rotatable member 10.

Removal of the shell 24 from the tubular parts of the swivel connection is accomplished by unscrewing the ring 29 from a leftward end of the bell shaped portion 36 of the shell 24 whereupon the shell 24 may be moved rightwardly off from the assembly of tubes 17, 18 and 19 as a single unit. At this time inspection of the parts of the rotary swivel may be made and replacement of parts may be performed as required.

I claim:

1. In means for transfer of fluids with relation to a relatively rotatable member having first, second and third passages therein: an outer tube projecting from said rotatable member in such position that its axis will be parallel to the axis of rotation of said rotatable member; a second tube extending from said rotatable member and within said outer tube so as to define between said outer and second tubes a first duct, said first duct communicating with said first passage of said member; a third tube extending within said second tube and forming between said second tube and said third tube a second duct, said second duct communicating with said second passage of said member, there being a third duct extending longitudinally within said third tube communicating with said third passage of said member; and a shell surrounding said tubes and supported for relative rotation with respect to said member, said shell having therein a first annular wall in sealing relation to said outer tube, a second annular wall in sealing relation to said second tube, a third annular wall in sealing relation to said third tube, a port between said first and second annular walls to communicate with said first duct, a port between said second and third annular walls to communicate with said second duct, and a port beyond said third annular wall communicating with said third duct.

2. In means for transfer of fluids with relation to a relatively rotatable member having first, second and third passages therein: an outer tube projecting from said rotatable member in such position that its axis will be parallel to the axis of rotation of said rotatable member; a second tube extending from said rotatable member and within said outer tube, the outer end of said second tube projecting from said outer tube and said outer and second tubes defining a first duct which communicates with said first passage of said member; a third tube extending within said second tube and forming between said second tube and said first tube a second duct, said second duct communicating with said second passage of said member, the end of said third tube projecting from said second tube and there being a third duct extending longitudinally within said third tube communicating with said third passage of said member; and a shell surrounding said tubes and supported for relative rotation with respect to said member, said shell having therein a first annular wall in sealing relation to said outer tube, a second annular wall in sealing relation to the projecting end of said second tube, a third annular wall in sealing relation to the projecting end of said third tube, a port between said first and second annular walls to communicate with said first duct, a port between said second and third annular walls to communicate with said second duct, and a port beyond said third annular wall communicating with said third duct.

3. In means for transfer of fluid with relation to a relatively rotatable member having an end face, a first passage arranged annularly in said face around the axis of rotation of said member, a second passage arranged in said end face annularly around said axis of rotation, said second passage being smaller in diameter than said first passage, and a third passage: an axially projecting outer tube secured to said end face of said rotatable member; a second tube extending from said rotatable member and within said outer tube so as to define between said outer and second tubes a first duct, said second tube having on the inner end thereof a flange comprising rubbery material the peripheral portion of which flange is clamped between said end face and said outer tube, said flange having an opening therein through which said first duct communicates with said first passage of said member: a third tube extending within said second tube and forming between said second tube and said third tube a second duct, said second duct communicating with said second passage of said member, there being a third duct extending longitudinally wthin said third tube communicating with said third passage of said member; and a shell surrounding said tubes and supported for relative rotation with respect to said member, said shell having therein a first annular wall in sealing relation to said outer tube, a second annular wall in sealing relation to said second tube, a third annular wall in sealing relation to said third tube, a port between said first and second annular walls to communicate with said first duct, a port between said second and third annular walls to communicate with said second duct, and a port beyond said third annular wall communicating with said third duct.

4. In means for transfer of fluids with relation to a relatively rotatable member having first, second and third passages therein: an organization projecting from said member comprising a first cylindrical wall, a second cylindrical wall of smaller diameter than said first cylindrical wall projecting axially from the end of said first cylindrical wall and a third cylindrical wall of smaller diameter than said second cylindrical wall projecting axially from said second cylindrical wall; and a cup shell surrounding said organization, there being a first annular seal between said shell and said first cylindrical wall, a second annular seal between said shell and said second cylindrical wall and a third annular seal between said shell and said third cylindrical wall, said shell having a first port between said first and second annular seals, a second port between said second and third annular seals and a third port defined by an opening facing the center of the end face of said third cylindrical wall, and said organization having a first duct connecting said first port with said first passage, a second duct connecting said second port with said second passage and a third duct connecting said third port with said third passage, the outer end of said third duct comprising an opening communicating with the center of the end face of said third cylindrical wall, and sealing means in one of said openings comprising a cylinder slidable in the opening and having an end engaging the wall which defines the mouth of the other of said openings, and spring means in the first of said openings acting against the cylinder to urge the same toward the wall which defines the mouth of the other said openings.

References Cited in the file of this patent

UNITED STATES PATENTS

| Number | Name | Date |
|---|---|---|
| 2,322,440 | Highberg | June 22, 1943 |
| 2,402,224 | Hornbostel | June 18, 1946 |